Oct. 29, 1963

N. E. WATSON ETAL 3,108,552

MINIMUM TILLAGE PLANTER

Filed May 23, 1960

INVENTORS
NORMAN E. WATSON
JOHN W. WATSON
BY
*Schmieding and Fultz*
ATTORNEYS

INVENTORS
NORMAN E. WATSON
JOHN W. WATSON
BY
Schmieding and Fultz
ATTORNEYS

INVENTORS
NORMAN E. WATSON
JOHN W. WATSON
BY
Schmieding and Fultz
ATTORNEYS

Oct. 29, 1963

N. E. WATSON ETAL 3,108,552

MINIMUM TILLAGE PLANTER

Filed May 23, 1960

*INVENTORS*
NORMAN E. WATSON
JOHN W. WATSON

BY

*Schmieding and Fultz*

ATTORNEYS 3,108,552
MINIMUM TILLAGE PLANTER
Norman E. Watson and John W. Watson, both of R.F.D. 3, Madison County, Ohio
Filed May 23, 1960, Ser. No. 30,963
1 Claim. (Cl. 111—52)

This invention relates to apparatus for planting seeds.

In general, the planter apparatus of the present application are modifications of the various planter apparatus disclosed in our co-pending application Serial No. 839,988, filed September 11, 1959, which is a continuation-in-part of our co-pending application Serial No. 823,449, filed June 29, 1959, now Patent No. 3,037,470. The various apparatus of the present invention are adapted to automatically plant seeds in spaced rows by a novel method which will be referred to herein as minimum tillage planting. This type of planting consists of forming compacted spaced bands of earth along the surface of a field with intermediate wider bands of non-compacted earth intermediate said compacted bands.

The seed is next planted only in the compacted rows, the loosely plowed intermediate non-compacted bands of earth serving to receive and retain rain water and effectively deliver same to the adjacent compacted bands whereby the seeds and plants will be effectively provided with water throughout the growing season.

As one important advantage, minimum tillage planting results in the rapid germination of the seed. This type of planting provides relatively narrow seed beds of compacted earth from which entrapped air has been removed. The seeds are placed on the prepared seed bed and osmotic action causes the moisture present in the earth to move upwardly in the compacted seed beds and into contact with the seeds. Since the seeds are in contact with moist earth the seeds germinate immediately after planting instead of waiting for the arrival of the next rain.

As another important advantage of minimum tillage planting each seed bed which is properly prepared for rapid germination has on each side of it an uncompacted root bed that permits rain to penetrate to the roots of the plants throughout the growing season. In addition, since the soil in the uncompacted root beds is not worked after plowing air will be entrained. Such entrained air is necessary for the growth of beneficial bacteria on the roots of the plant as they spread out into the root beds during the growing season.

As still another advantage of minimum tillage planting the relatively wide uncompacted root beds provide a poor environment for the germination of weed seeds since the subsurface moisture cannot work upwardly through the uncompacted soil by osmotic action.

In the instance of corn planting the seeds need a seed bed for approximately ten days and a root bed for approximately six months' growing season. Hence it will be understood that minimum tillage planting, and apparatus constructed according to the present invention, condition the field to take care of the specific requirements of both the germinating seed and the growing plants.

In general, the planter apparatus of the present invention comprises a main frame which, in the case of the embodiments illustrated and described herein, is mobilized by attachment to one or more tractors. It will be understood that the planter frame can be designed as a self-propelled vehicle without departing from the spirit of the present invention.

The frame of the present invention is supported by a plurality of laterally spaced ground engaging portions or compacting wheels, said wheels being spaced at distances equal to the spacings between the compacted rows to be formed.

The rear portion of the planter frame carries a plurality of seed dispensing means laterally spaced at distances equal to the spacings between the compacting wheels that follow whereby each compacting wheel is followed by a respectively longitudinally aligned seed dispensing means.

For purposes of breaking up large clumps of earth present in the plowed field prior to planting, a plurality of hoe means are mounted to the forward portion of the planter frame and each of said hoe means leads and is longitudinally aligned with a respective one of said compacting wheels.

In accordance with the present invention, each of the compacting wheels is attached to the frame by a mount that includes a pressure equalizing means for maintaining substantially equal pressure between the compacting wheels and the ground notwithstanding variations in the vertical positions of the compacting wheels.

It is therefore an object of the present invention to provide a planter apparatus for minmum tillage planting that automatically plants seed in spaced compacted bands of earth separated by intermediate bands of non-compacted earth to more effectively water the seed and growing crop and thereby achieve increased yield per acre.

It is another object of the present invention to provide a planter apparatus of the type described that includes a plurality of laterally spaced compacting wheels, longitudinally aligned with a plurality of seed dispensing means that follow, said wheels being arranged to engage the earth with substantially equal pressure notwithstanding variations in the surface level of the earth whereby spaced equally compacted bands of earth are formed by the compacting wheels.

It is still another object of the present invention to provide a planter apparatus of the type described that includes a plurality of laterally spaced compacting wheels that engage the surface of the earth with substantially equal pressure, said apparatus being adapted for selective adjustment of the lateral spacings of the compacting wheels.

Further objects and advantages of the present invention will be apparent from the following description, reference being had to the accompanying drawings wherein preferred forms of embodiments of the invention are clearly shown.

Figure 4:
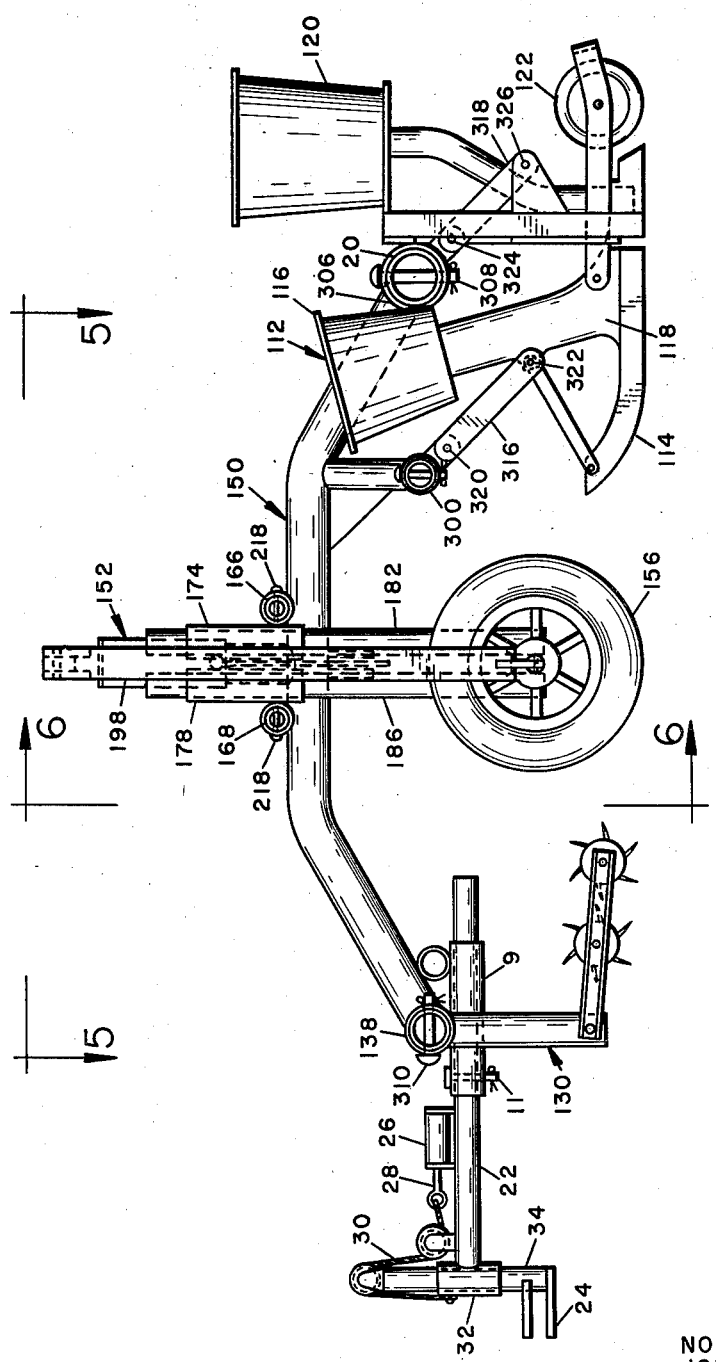
FIG. 4 is a side elevational view of a second minimum tillage planter constructed in accordance with the present invention and constituting a second aspect thereof.
Figure 5:
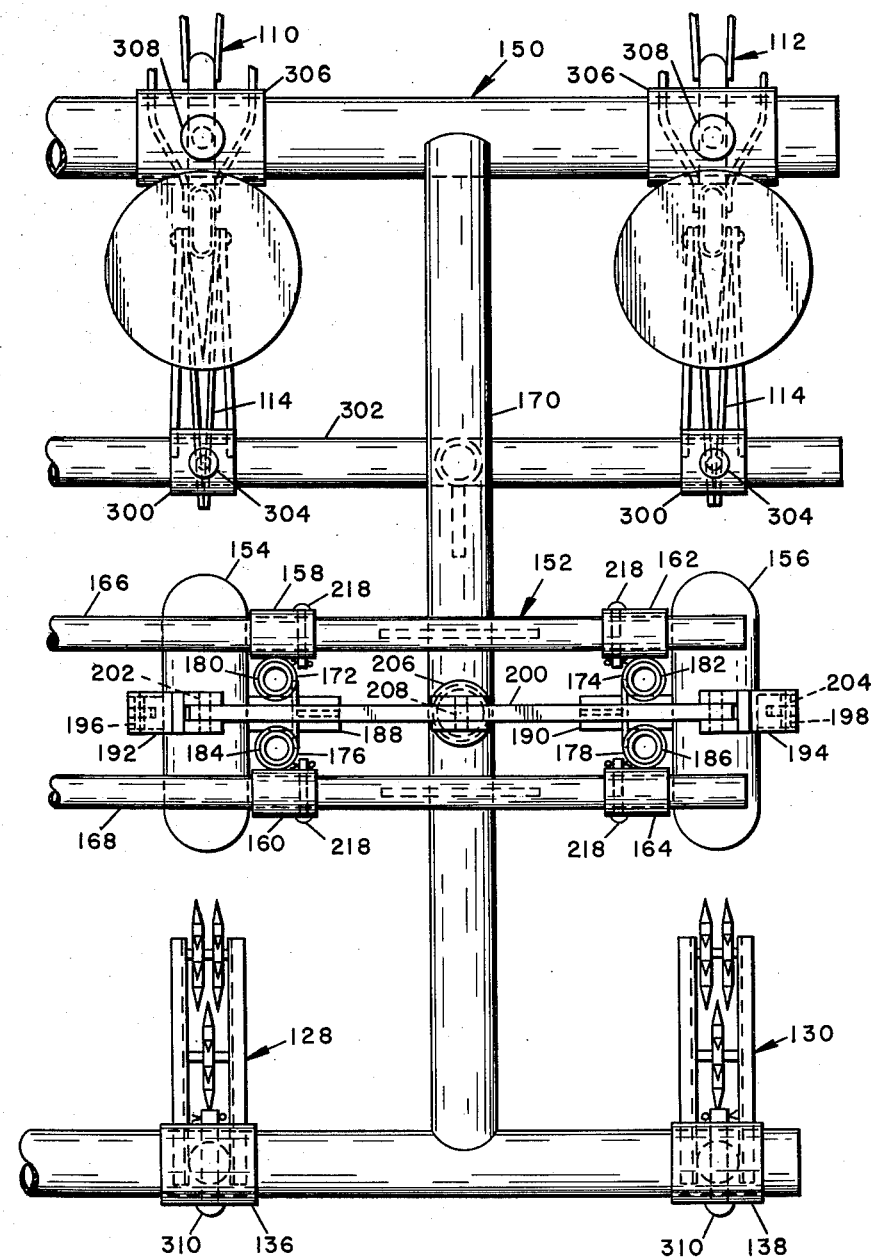
FIG. 5 is a partial plan view of the planter of FIG. 4.
Figure 7:
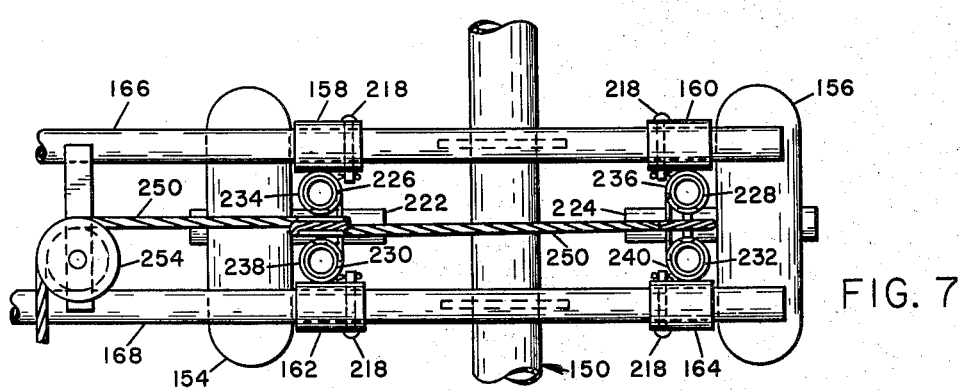
Figure 8:
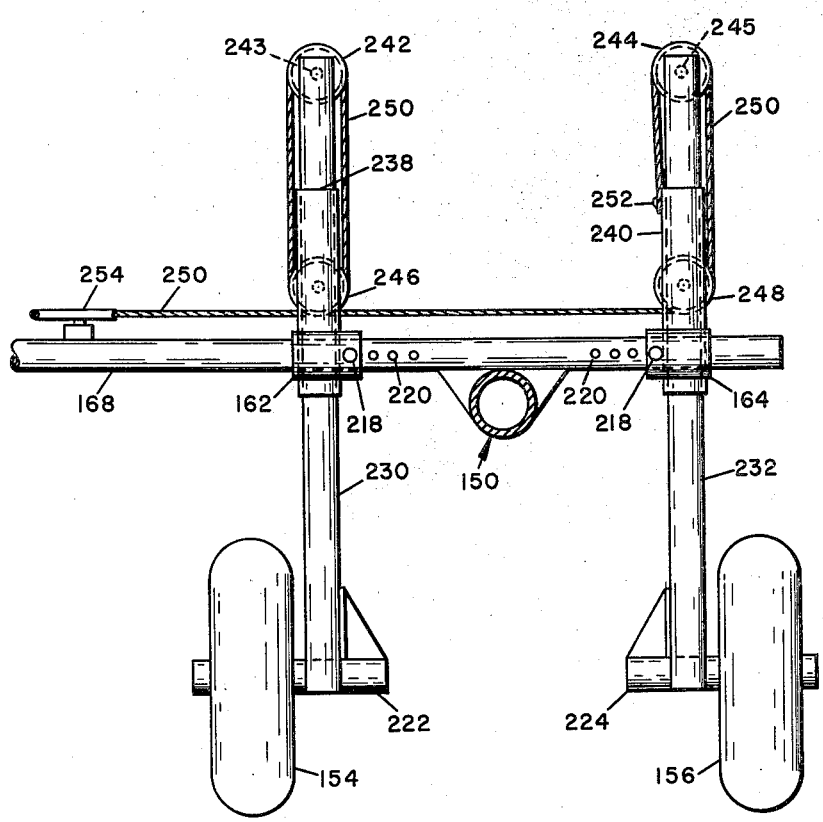
Figure 10:
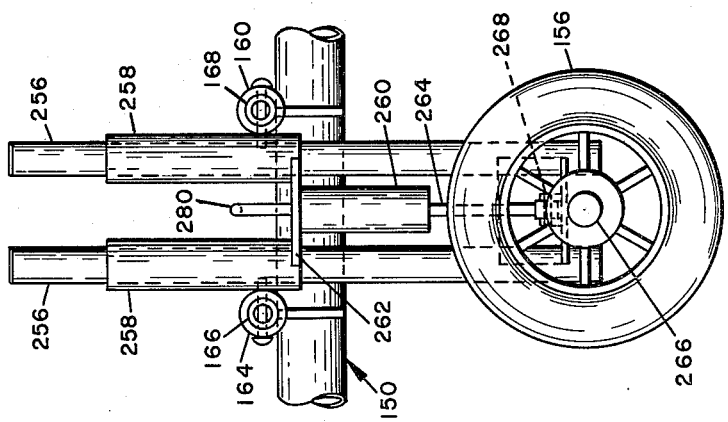
Figure 9:
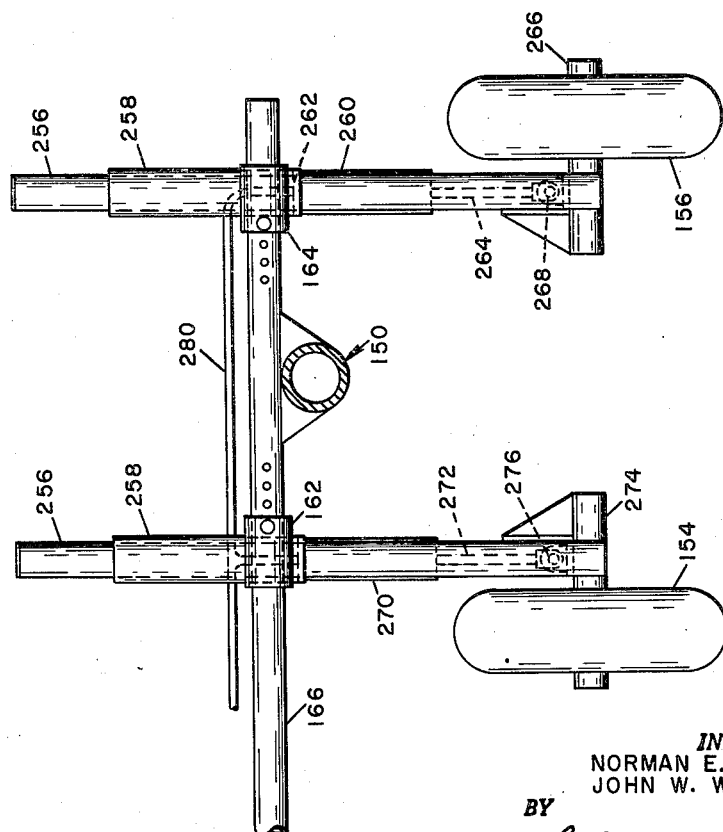

FIGS. 7 and 8 are top and front elevational views of a modified wheel mounting apparatus for the planter of FIGS. 4 and 5; and FIGS. 9 and 10 are front and side elevational views of a second modified wheel apparatus for the planter of FIGS. 4 and 5.

Figure 1:
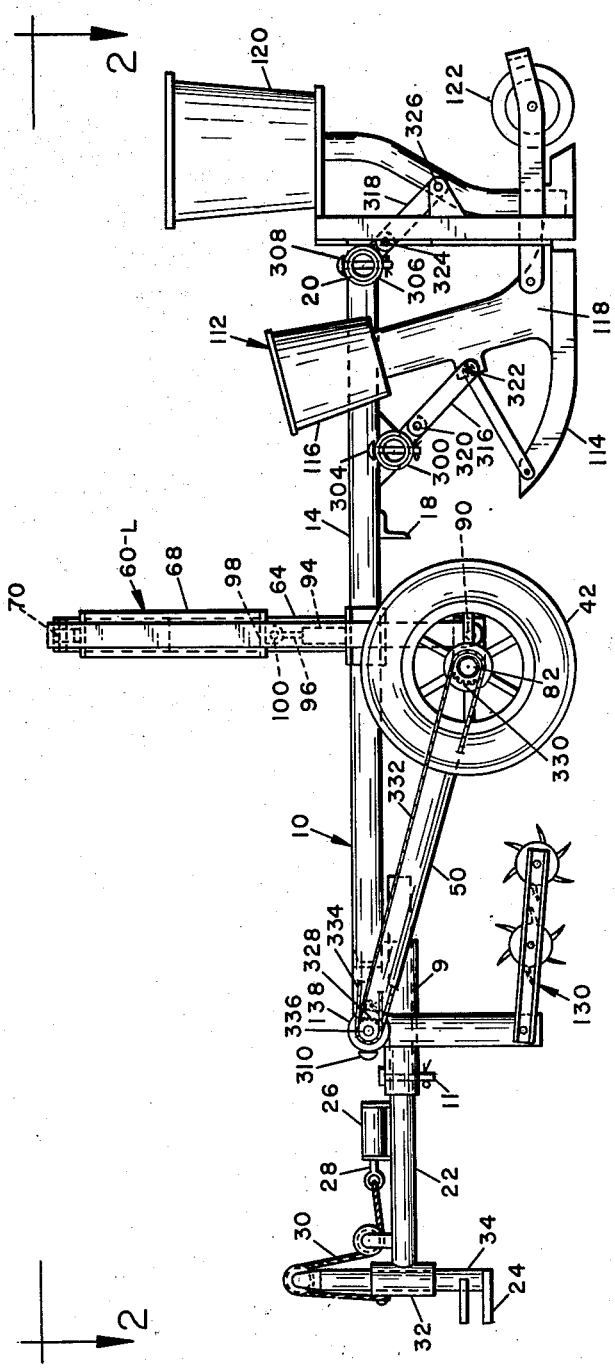
FIG. 1 is a side elevational view of a minimum tillage planter constructed in accordance with the present invention.
Figure 2:
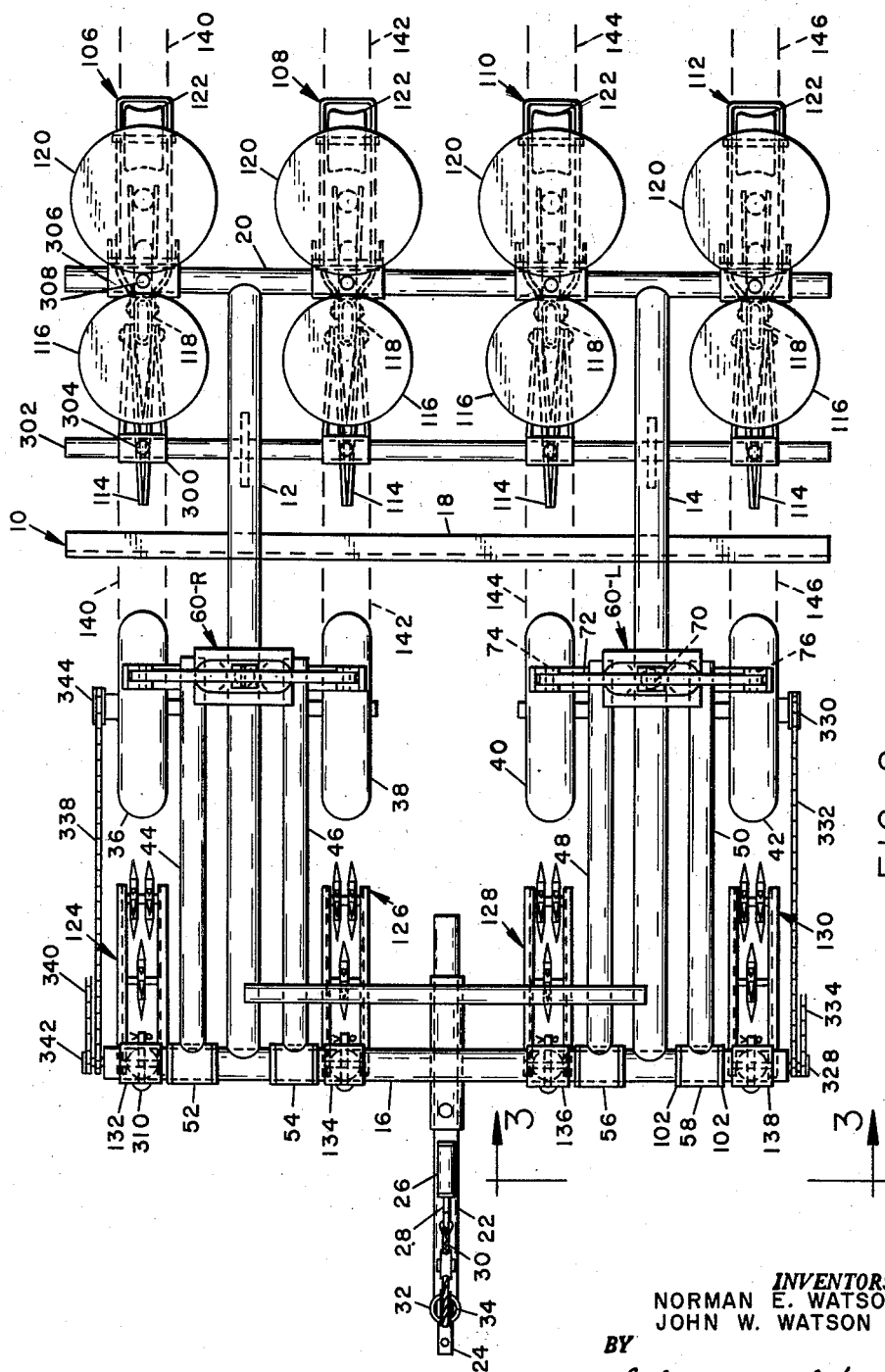
FIG. 2 is a plan view of the planter of FIG. 1.
Figure 3:
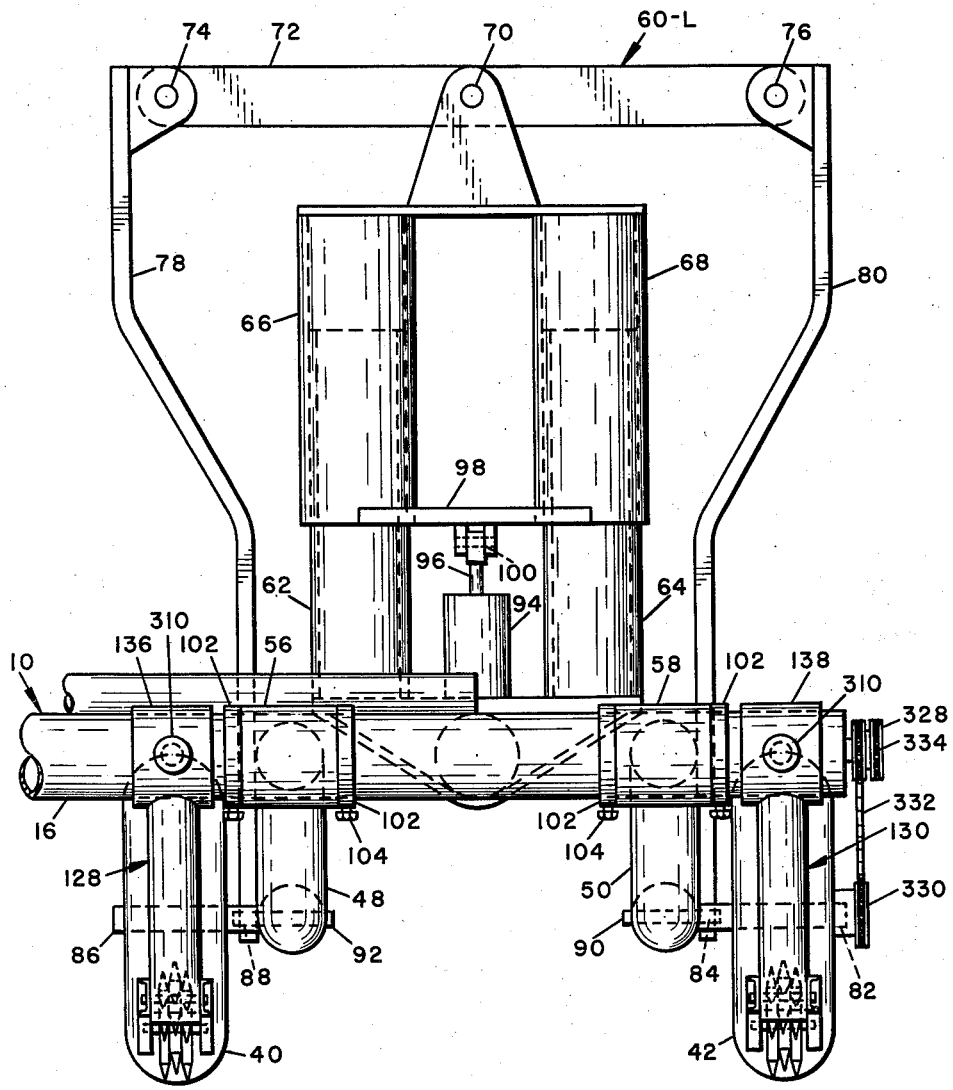
FIG. 3 is a partial front elevational view of the planter of FIG 1.

Referring in detail to the drawings the planter of FIGS. 1–3 includes a main frame 10 provided with longitudinally extending frame members 12 and 14 joined by a forward laterally extending tubular member 16 and transverse angle members 18 and 20.

The planter is moved through a field by attaching a draw bar 22 to the rear of a tractor at the spaced attachment plates 24.

The front end of the frame 10 of the planter can be raised and lowered by means of a hydraulic cylinder 26 that receives pressurized fluid from a suitable source such as a hydraulic pump mounted on the tractor. When the ram 28 of hydraulic cylinder 26 is retracted a cable 30 raises a sleeve 32 slidably mounted on vertical tube 34. This causes draw bar 22 and the front end of frame 10 to be moved upwardly relative to the mounting plates 24 attached to the tractor.

The planter further includes a plurality of laterally spaced compacting wheels 36, 38, 40, and 42, each of which is independently suspended on a respective rearwardly extending lever 44, 46, 48, and 50.

As is best seen in FIGS. 2 and 3 the forward ends of each lever is welded to a respective bearing 52, 54, 56, and 58.

With reference to FIG. 2 the left pair of compacting wheels 40 and 42 is provided with a left pressure equalizing mechanism indicated generally at 60-L and the right pair of compacting wheels 36 and 38 is provided with a right pressure equalizing mechanism indicated generally at 60-R. A front view of the left pressure equalizing mechanism 60-L is illustrated in enlarged detail in FIG. 3. This mechanism includes a pair of vertically extending columns 62 and 64 carried by the main frame 10. A pair of tubes 66 and 68 are supported in telescoping relationship on columns 62 and 64 and carry a longitudinally extending pivot rod 70.

With continued reference to FIG. 3 a transverse pivot bar 72 is pivotally mounted at its center on pivot pin 70 and the ends of pivot bar 72 carry pivot pins 74 and 76 that are pivotally attached to the upper ends of struts 78 and 80.

The lower end of strut 80 is connected to an axle 82 at a bearing 84 and the lower end of strut 78 is connected to an axle 86 at a bearing 88. As seen in FIG. 3 the inner ends of the axles 82 and 86 are attached to the ends of levers 50 and 48 by means of the stub shafts 90 and 92 that extend through the ends of the levers.

Pivot center 70 can be raised and lowered by means of a power cylinder 94 that is mounted on frame 10 and connected to a suitable source of pressurized fluid. A ram 96 of power cylinder 94 is connected to the lower ends of vertically movable tubes 66 and 68 by means of a transverse bracket 98 attached to ram 96 at a pin 100.

The lateral spacing between compacting wheels 40 and 42 can be adjusted by moving bearings 56 and 58 along transverse tubular frame member 16 to various selected positions. This permits varying the distance between wheel mounting levers 44 and 46 or wheel mounting levers 48 and 50. Bearings 56 and 58 are maintained in various positions of adjustment by means of collars 102 provided with set screws 104.

The right pressure equalizing mechanism 60-R is identical in structure and operation to the pressure equalizing mechanism 60-L just described.

With continued reference to FIGS. 1 and 2 the rear portion of frame 10 carries a plurality of seed dispensing means indicated generally at 106, 108, 110, and 112. Each of the seed dispensing means includes a shoe 114 longitudinally aligned with a respective compacting wheel 36—42. Each seed dispensing means includes a seed hopper 116, a seed releasing mechanism 118, a fertilizer hopper 120, and a compacting wheel 122.

Each of the seed dispensing means 106—112 is independently vertically movable since it is mounted to the frame by a parallel linkage that includes a link 316 pivotally attached to collar 300 at a pivot 320 and pivotally attached to a seed dispensing means at a pivot 322. The parallel linkage also includes a second link 318 having one end pivotally attached to collar 306 at a pivot 324 and a second end attached to the seed dispensing means at pivot 326.

As is best seen in FIGS. 1 and 2 the front end of the frame 10 includes a plurality of laterally spaced hoe means indicated generally at 124—130, each of said hoe means being longitudinally aligned with a respective compacting wheel 36—42. The forward ends of the hoe means are mounted to transverse tubular member 16 at a respective laterally adjustable collar, each collar is positioned and retained against rotation by pin 310.

In operation of the apparatus of FIGS. 1–3 frame 10 is attached to the tractor by draw bar 22 and is driven across the surface of a plowed field whereby hoe means 124—130 break up the clumps in the plowed field and release air entrapped in the earth. The hoed bands of earth are next engaged by compacting wheels 36—42 which form the spaced compacted bands of earth indicated in dotted delineation at 140—146 in FIG. 2. Due to the pivotal mounting of the compacting wheels 36—42 at the bearing portions 52—58 and the pressure equalizing mechanism illustrated in FIG. 3 all of the compacting wheels will engage the earth with equal pressure notwithstanding variations in the level thereof. For example, if compacting wheel 42, FIG. 3, encounters a high stretch of ground, strut 80 and the right end of pivot bar 72 will rise with a corresponding lowering of strut 78, the right end of pivot bar 72 and compacting wheel 40. It will be understood that both wheels will engage the earth with the same pressure since the portion of the frame load supported by the wheels 40 and 42 is suspended beneath pivot rod 70 that is connected to the center of pivot bar 72 mid-way between the end pivot pins 74 and 76.

The above explanation also applies to the right pair of compacting wheels 36 and 38 and the associated pressure equalizing mechanism 60-R.

As the planter proceeds across the field, the shoes 114 dig into the center of the compacted bands of earth indicated in dotted delineation 140—146 and form furrows for receiving the seed released from seed hoppers 116 by the seed dispensing means 118. If desired, the fertilizer hoppers 120 can be mounted to frame 10 behind the seed dispensing means for applying fertilizer to the seeds as they are dispensed.

The seeded furrows are closed and compacted by the drums 122 that engage the compacted band of earth behind the seed dispensing means.

If desired, frame 10 can be vertically adjusted relative to compacting wheels 136—142 by introducing or releasing fluid into or out of power cylinder 94. When the power cylinder is pressurized ram 96 is retracted whereby columns 66 and 64 and frame 10 move upwardly relative to struts 78 and 80 and wheels 40 and 42. When fluid is released from power cylinder 94 frame 10 is lowered relative to compacting wheels 36 and 42.

As previously described, the front end of the frame can be lowered or raised by actuating power cylinder 26 operatively connected to sleeve 32 slidably mounted on vertical tube 34. It will now be understood that the frame 10 can be leveled and raised and lowered by means of the forward power cylinder 26 and the rear power cylinder 94.

With reference to FIGS. 1 and 2, the seed releasing mechanisms, not illustrated, of the seed dispensing means 106—112 are driven from compacting wheels 36 and 42. Sprockets 328 and 330 and chains 332 and 334 connect the seed dispensing mechanism with left compacting wheel 42. Similarly, sprockets 342 and 344 and chains 338 and 340 connect the seed dispensing mechanisms with right compacting wheel 36.

Figure 6:
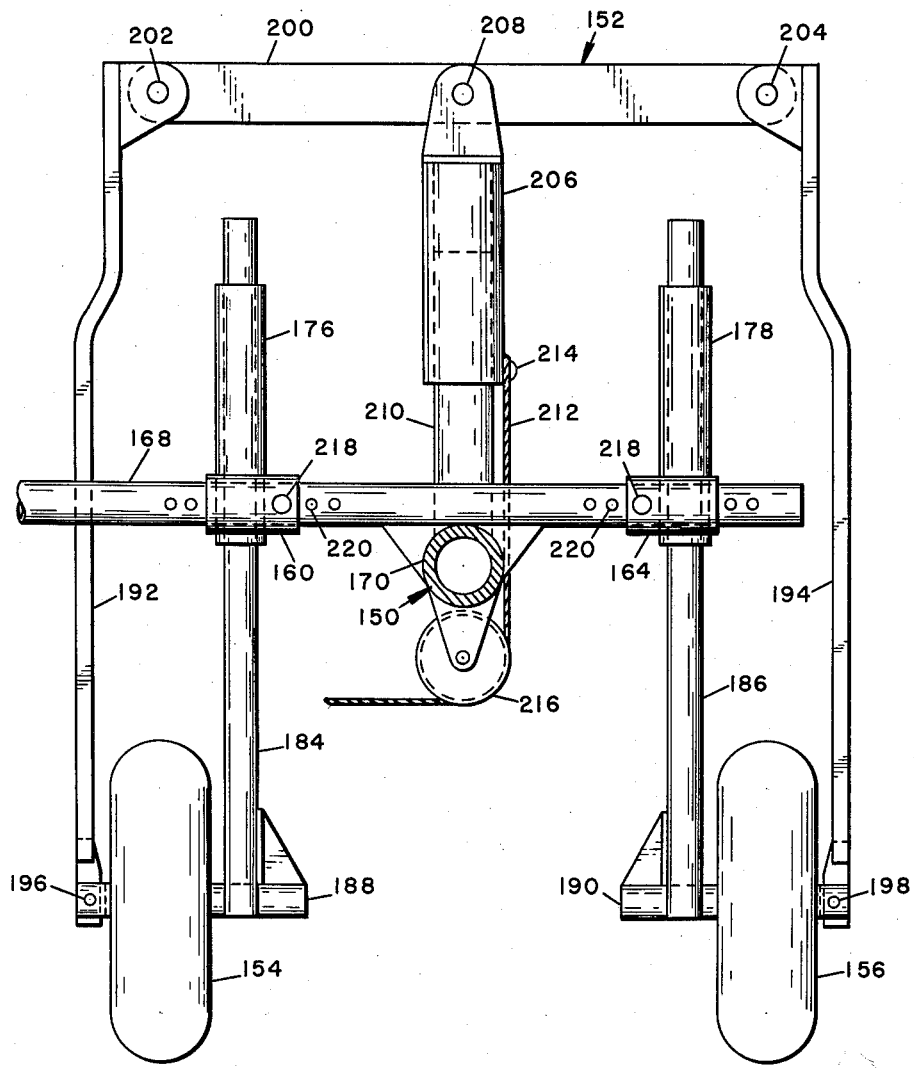
FIG. 6 is a partial front view, partially in section, of a wheel mounting mechanism constituting a portion of the planter of FIG. 4.

Reference is next made to FIGS. 4–6 which illustrate a second apparatus constructed in accordance with the present invention and constituting a modification thereof. The apparatus of FIGS. 4–6 includes a main frame indicated generally at 150 that includes a draw bar 22 for attachment to the rear end of a tractor. The mechanism for raising and lowering the front end of the draw bar includes a power cylinder 26 and associated elements which are the same as those previously described in connection with the modifications of FIGS. 1–3.

The forward end of the machine includes a plurality of hoe means, two of which are indicated generally at 128 and 130.

The rear end of the machine carries seed dispensing means, two of which are indicated generally at 110 and 112 and are the same as those previously described in connection with the planter of FIGS. 1–3.

The machine of FIGS. 4–6 differs from the machine of FIGS. 1–3 in that it includes novel right and left pressure equalizing mechanisms, the left one of which is indicated generally at 152 and set forth in enlarged detail in FIGS. 5 and 6.

The planter of FIGS. 4–6, like the planter of FIGS. 1–3, includes a right and left pair of compacting wheels. In the interest of simplicity only the left side of the planter is illustrated in FIG. 5 and FIG. 6 and hence only the left pair of compacting wheels 154 and 156 appear in these views.

The pressure equalizing mechanism 152 includes a plurality of slidably mounted collars 158—164 which are carried on transverse tubular frame members 166 and 168, the latter being welded to space longitudinally extending frame members, one of which is illustrated at 170.

The collars 158—164 carry upright tubular guides 172—178 that receive struts 180—186 in telescoping relationship therewith.

Axles 188 and 190 are welded on the lower ends of the struts 180—186 and rotatably support the wheels 154 and 156.

A pair of outer struts 192—194 have their lower ends attached to the outer ends of axles 188—190 at pivot pins 196—198. The upper ends of struts 192—194 are pivotally attached to opposite ends of pivot bar 200 at pivot pins 202 and 204, the center of said pivot bar being attached to tube 206 at a central pivot pin 208.

As is best seen in FIG. 6, frame 150 carries an upstanding column 210 which is slidably received by the bore of tube 206 and a cable 212 is attached to tube 206 at connector 214 and extends around a pulley 216 and thence to a power means, not illustrated, such that application of tension to cable 212 will lower frame 150 and the seed releasing mechanism 112—116 rigidly mounted on said frame means.

With continued reference to FIGS. 4–6 the lateral spacing between the compacting wheels 154—156 can be adjusted by removing pins 218, sliding the collars laterally along transverse frame members 166—168, and by replacing pins 218 in appropriate holes, a plurality of which are drilled in the frame members 166—168 and designated at 220.

Reference is next made to FIGS. 7 and 8 which illustrate a modified pressure equalizing mechanism for the planter of the type illustrated in FIGS. 4–6.

The modifications of FIGS. 7–8 include the same longitudinal frame members 150 and lateral frame members 166 and 168.

The compacting wheels 154—156 are mounted on axles 222 and 224 which are in turn mounted on the lower ends of struts 226—232. The struts are slidably mounted in upright guides 234—240 which are in turn mounted on laterally adjustable collars 158—164.

The pulleys 242 and 244 are rotatable on shafts 243 and 245 the latter being carried by the upper ends of struts 226—232. Pulleys 246—248 are mounted on the main frame on shafts that extend between upright guides 238—240.

With continued reference to FIGS. 7 and 8 a cable 250 is connected to guide 240 at a connector 252 and extending over pulley 244, under pulley 248, under pulley 246, over pulley 242, again under pulley 246 and thence around a pulley 254 to a power means not illustrated.

In operation of the apparatus of FIGS. 7 and 8 when one of the wheels, such as wheel 156, encounters a high ridge of ground struts 232 and 228 will slide upwardly in guides 236 and 240. This shortens the lengths of cable between pulleys 244 and 248 and lengthens the lengths of cable 250 between pulleys 242 and 246. Since the tension in cable 250 must be the same in all portions of it length it will be understood that wheels 154 and 156 will always engage the ground with equal pressure.

In the apparatus of FIGS. 7 and 8 the lateral spacing between the wheels 154 and 156 can be adjusted by removing pins 218, sliding collars 162 and 164 along lateral members 166 and 168 and by repositioning pins 218 in appropriate holes indicated at 220.

With continued reference to FIGS. 7 and 8, when it is desired to raise the frame 150, and the seed dispensing means 112—118 rigidly mounted thereon, it is only necessary to energize a power means connected to cable 250 so as to draw in the cable and decrease the effective lengths extending between the pulleys 242 and 246 and between the pulleys 244 and 248.

Reference is next made to FIGS. 9 and 10 which illustrate a second modified pressure equalizing means for a planter of the type illustrated in FIGS. 4–6.

In the apparatus of FIGS. 9 and 10 only the two left compacting wheels 154 and 156 are illustrated, it being understood that the planter includes a right pair of compacting wheels provided with a similar pressure equalizing apparatus.

As seen in FIGS. 9 and 10 frame 150 carries transverse frame members 166 and 168 which in turn slidably carry laterally adjustable collars 162 and 164.

Four upright struts 256 are slidably mounted in upright guides 258, the latter being welded to the sides of adjustable collars 158—164. An outer hydraulic cylinder 260 is mounted on frame 150 at a bracket 262 and the ram 264 of the hydraulic cylinder is connected to an outer axle 266 at a pin connection 268.

Similarly an inner hydraulic cylinder 270 has its upper end mounted to frame 150 and includes a ram 272 connected to lower axle 274 at a pivot pin 276.

The chambers within power cylinders 260 and 270 are commonly connected by a line 280 that communicates with a suitable source of pressurized hydraulic fluid not illustrated.

In operation of the apparatus of FIGS. 9 and 10 when one of the wheels, such as 156, encounters a high ridge of ground the wheel and struts 256 will move upwardly relative to the frame and fluid will be expelled from power cylinder 260 via line 280 to power cylinder 270. This will cause wheels 154 and struts 256 to move downward and since both of the hydraulic cylinders are subjected to the same hydraulic pressure the two compacting wheels 154 and 156 will always engage the ground with equal pressure.

With continued reference to FIGS. 9 and 10 if it is desired to raise the frame 150, and the seed dispensing means 112—118 rigidly mounted thereon, relative to the wheels it is only necessary for the operator to open an appropriate valve means to release pressurized fluid via line 280 to the chambers in power cylinders 260 and 270. This causes both of the rams 264 and 272 to extend and raise the frame 150 and the seed dispensing means mounted thereon.

Each of the planters disclosed herein includes means for adjusting the lateral spacings between the seed dispensing means 112 and between the fertilizer hoppers 120.

With reference to the planter of FIGS. 1 through 3 the seed dispensing means 112 are each mounted on a collar 300 slidably carried on a transverse frame member 302. Collars 300 are positioned and retained against rotation by pins 304 which can be selectively extended through laterally spaced holes in transverse frame member 302.

Each of the fertilizer hoppers 120 is mounted on a respective collar 306 slidably carried on transverse frame member 20. Each collar is positioned and retained against rotation by a pin 308 which is selectively extended through one of a plurality of laterally spaced holes through transverse frame member 20.

While the forms of embodiments of the present invention as herein disclosed constitute preferred forms, it is to be understood that other forms might be adopted, all coming within the scope of the claim which follows.

We claim:

A minimum tillage planter comprising, in combination, frame means including a transverse frame member; a right longitudinally extending arm having a first end attached to said frame means and a second end; a left longitudinally extending arm having a first end attached to said frame means and a second end; a first vertically extending guide portion mounted on said frame means; a second vertically extending guide portion slidably mounted on said first guide portion; a laterally extending member pivoted at its center to said second guide portion and including a right end and a left end; a right vertically extending strut including an upper end pivoted on said right end of said member and a lower end connected to said second end of said right arm; a right compacting wheel mounted to the lower end of said right strut; a left vertically extending strut including an upper end pivoted on said left end of said member and a lower end connected to said second end of said left arm; a left compacting wheel mounted to the lower end of said left strut; power means operatively connected between said second guide portion and said frame for raising and lowering said frame; a first seed dispensing means mounted to said frame means and longitudinally aligned with said right compacting wheel; a second seed dispensing means mounted to said frame means and longitudinally aligned with said left compacting wheel, said first ends of said first and second arms including spaced first and second bearing portions mounted on said transverse frame member; and means for adjusting the distance between said bearing portions.

References Cited in the file of this patent
UNITED STATES PATENTS

| | | |
|---|---|---|
| 910,337 | Willis | Jan. 19, 1909 |
| 1,282,124 | Phillips | Oct. 22, 1918 |
| 1,460,236 | Ford | June 26, 1923 |
| 2,675,247 | Meng | Apr. 13, 1954 |
| 2,754,647 | Bennett | July 17, 1956 |
| 2,777,709 | Tucker | Jan. 15, 1957 |
| 2,887,322 | De Monge | May 19, 1959 |
| 2,930,335 | Hage | Mar. 29, 1960 |

FOREIGN PATENTS

| | | |
|---|---|---|
| 1,022,353 | France | Dec. 17, 1952 |
| 200,858 | Great Britain | July 23, 1923 |
| 796,151 | Great Britain | June 4, 1958 |